United States Patent Office 3,430,517
Patented Mar. 4, 1969

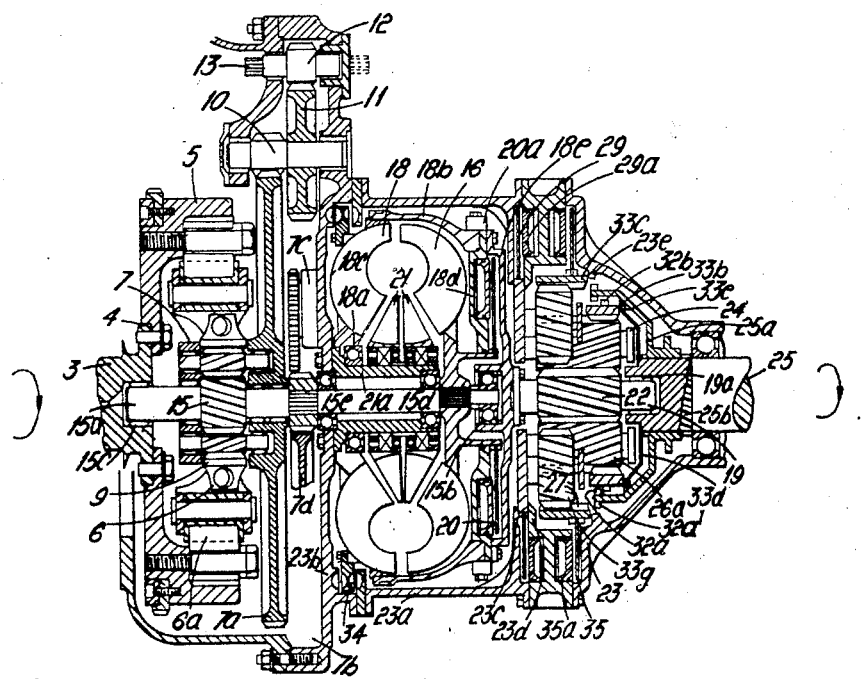

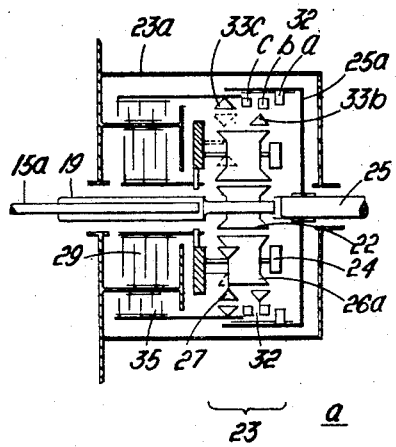
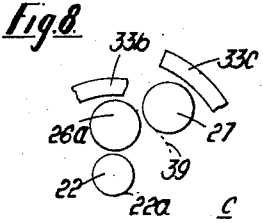
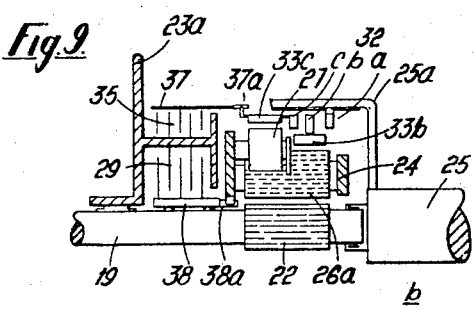

3,430,517
VEHICLE TRANSMISSIONS
Paul Wilhelm Glamann, 5A Lehmbacher Weg, D-5062
Forsbach, Cologne, Germany
Filed Dec. 29, 1966, Ser. No. 605,655
Claims priority, application Germany, Jan. 7, 1966,
G 45,662/66; Mar. 17, 1966, G 46,326/66
U.S. Cl. 74—674                           8 Claims
Int. Cl. F16h 37/06

ABSTRACT OF THE DISCLOSURE

A vehicle transmission and control therefor having a primary planetary gear set with a first output connected to drive an engine supercharger and a second output connected through a hydrodynamic torque converter to drive a second planetary gear set having two reduced ratio speeds in one direction of rotation and one ratio in the opposite direction. A hydrodynamic brake is provided on the output of the torque converter as is a clutch for locking up the converter.

Figure 3:
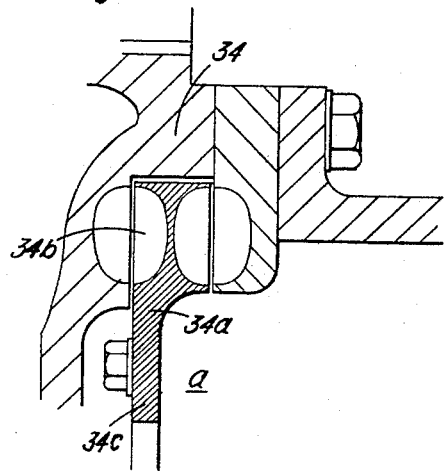

This invention relates to transmission assemblies in which the drivable input is the input element of a differential gear of which is a first output element transmits drive to the transmission output shaft through a hydrodynamic torque converter and a gear train incorporated in a shift gearbox. Such transmission assemblies are referred to hereinafter as "transmission assemblies of the type referred to."

The invention is particularly applicable to transmission assemblies of the type referred to for use with a supercharged internal combustion engine.

In previously proposed transmission assemblies of the type referred to an attempt has been made to solve the problems posed by the requirement that the power-transmitting capability should be as high as possible while the outline dimensions should be as small as possible, this requirement being qualified by such factors as cost of manufacture, reliability, simplicity of control and ease of maintenance. These problems have hitherto been solved to a certain extent by the application of inventive ingenuity to the design of the three main groups of components, such transmission assemblies comprise namely the engine output associated group (including said differential gear), the hydrodynamic group (including said torque converter) and the changes-speed gear box group (including said gear train). Hitherto, however, the disadvantage has remained that these groups have not existed satisfactorily as independent assemblies separable one from the other and each capable of being individually tested and at the same time meeting the requirement of restriction to the smallest possible outline dimensions when connected together to form a transmission assembly of the type referred to.

An object of the present invention is to provide an improved transmission assembly of the type referred to and in which the above mentioned disadvantage is obviated or mitigated.

According to the present invention, there is provided a transmission assembly of the type referred to in which said differential gear and said gear train are respectively primary and secondary epicyclic gears the sun-wheels of which are connected to each other through said hydrodynamic torque converter, the primary gear annulus and sunwheel being respectively said drivable input element and said first output element, the primary sunwheel being connected to the pump impeller of the converter by means of a shaft which extends co-axially with and through the turbine wheel of the converter, said turbine wheel being connected to the secondary sun-wheel by means of a bell which surrounds the pump impeller and is connected to the turbine wheel and the secondary sun wheel, said secondary epicyclic gear having a first and a second annulus in mesh respectively with first and second mutually meshing planet wheels of which the first planet wheels mesh with the secondary sun-wheel, and means drivingly connected to said transmission output shaft and movable so as to engage selectively said first and second annuli to obtain forward and reverse drive respectively, the arrangement being such that when said first annulus is engaged a first forward drive is obtainable when said second annulus is free to rotate and a second higher ratio forward drive is obtainable when said second annulus is locked.

Further, according to the present invention, there is provided a transmission assembly of the type referred to in which said differential gear and said gear train are respectively primary and secondary gears, said transmission assembly comprising three groups of components each group capable of being individually tested and having the following composition:

Engine output associated group comprising a flywheel, a vibration damper, the primary gear, a super-charger drive, auxiliary output drives and a housing;

Hydrodynamic group comprising the hydrodynamic torque converter, a converter bridge-coupling, a bridge-coupling control device, a hydrodynamic brake and a housing;

Change-speed gear-box group comprising the secondary gear, locking devices for obtaining gear change, a brake for obtaining reverse gear, a transmission output shaft and a housing.

Still further, according to the present invention, there is provided for use in a transmission assembly of the type referred to a shift gear box including an epicyclic gear train having a sun-wheel, first and second annuli in mesh respectively with first and second mutually meshing planet-wheels of which the first planet-wheels mesh with the sun-wheel, and a rotatable planet carrier, the sun-wheel being the gear box input member, the first annulus being the gear box output member in one direction of drive, the second annulus being the gear box output member in the opposite direction of drive, and the second annulus being free to rotate during said one direction of drive in a first gear and lockable during said one direction of drive so as to establish a second gear.

Figure 4:
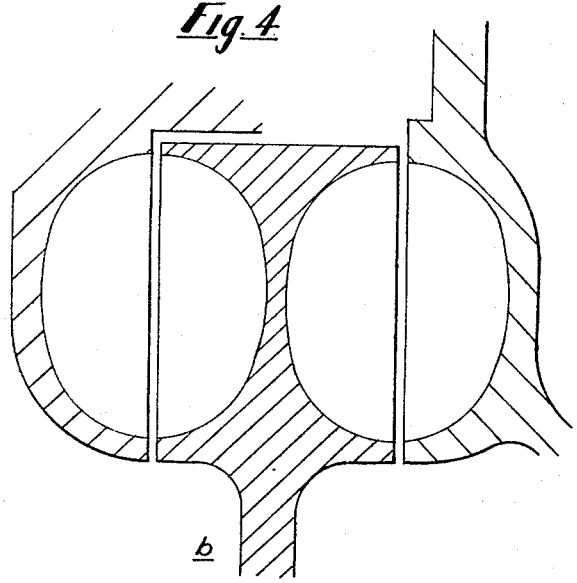

An embodiment of the present invention will now be described, by way of example, with reference to the accompanying drawings, in which:

FIG. 1 is a sectional elevation of a transmission assembly of the type referred to and in accordance with the present invention, FIG. 2 is a view of an arrangement of an alternative auxiliary power takeoff drive to a larger scale than FIG. 1, FIG. 3 is a sectional elevation of part of a hydrodynamic brake shown in FIG. 1 and to a larger scale, FIG. 4 is a sectional elevation of part of a previously proposed hydrodynamic brake to the same scale as FIG. 3, FIG. 5 is a diagrammatic representation of a hydraulic control circuit, FIG. 6 is a diagrammatic representation of a selector lever having pushbutton switches, FIG. 7 is a diagrammatic sectional elevation of a shift gearbox, FIG. 8 is a diagrammatic end view of a part of FIG. 7, and FIG. 9 is a more detailed sectional elevation of part of the shift gear box of FIG. 7 and to a larger scale.

In FIG. 1 the output-end of the crankshaft of a supercharged internal combustion engine is shown at 3 with an output-drive flange 4, to which is secured a flywheel 5 of the engine. The flywheel is connected through a vibration damper 6a with a secondary-mass 6, which at the same time represents the mass of the annulus 9 of a primary epicyclic gear 8. This primary gear 8 is placed in a space surrounded by the flywheel 5.

The planet carrier 7 of the primary gear is connected to the input shaft 13 of a supercharger-blower (not shown) of the internal combustion engine through the intermediate gears 7a, 10, 11, 12, whereby the blower, as is indicated by the dotted outline on the right of the stubshaft of the shaft 13, can also be arranged on the gearbox-casing. Instead of intermediate gearing to alter torque and speed, a rotating reduction-gear unit can be provided, mounted coaxially to the blower.

The sunwheel 15 of the primary gear is connected through a long, stepped, fast-rotating intermediate-shaft 15a with a pump impeller 16 of a Fottinger converter 17 whose turbine-wheel 18 is centrally penetrated by the long intermediate shaft 15a. The long-fast-rotating, intermediate shaft is supported in a first connecting bearing 15c in the crankshaft-end 3 of the internal combustion engine.

Immediately following the intermediate-gear driving wheel 7a, oil-pumps 7c and auxiliary output-drives 7d are accommodated in the disc-shaped space 7, within which are the third and fourth gearwheels 11 and 12 of the intermediate gearing. The drive of the oil-pumps and auxiliary output (7c, 7d) drives is, however, effected more practically through a chain as is shown in FIG. 2 so that, despite the narrowness of the space 7b and the limiting thickness of the adjacent wall 23b in the vicinity of the axis, powerful auxiliary equipment can be provided for.

The auxiliary output-drives form, together with the flywheel 5, the vibration damper 6a, the primary gear 8 and the blower transmission gearing 7a, 10, 11, 12, together with the blower input shaft 13, a first, self-contained group of components which will be termed the engine output associated group. This is sealed-off by a housing partition 23b, which is placed between the first planetary set and the converter and at the same time forms the boundary of the actual internal combustion power unit so that this, if need be, can also be equipped with other transmission components as well as the converter and the shift gearbox with which the present transmission is provided.

To the housing partition 23b, a stationary tube 21a is secured which supports the compound guide-wheel 21 of the Fottinger converter 17 by way of free-wheels and bearings.

The inventive arrangement permits a central shaft of very small diameter to be provided in the converter, since it is the pump-shaft and not, as is usual, the turbine-shaft which passes through the converter. By this means, the converter can be provided with the necessary small external dimensions without the securing of these small dimensions being impeded by the too large dimensions of the central converter-shaft.

The long, fast-rotating, intermediate shaft 15a is firmly supported within the stationary tube 21a in a second and third bearing 15d and 15e in the housing.

The turbine impeller 18, 18c of the converter is supported in a central bearing 18a on the stationary tube 21a so that it is sealed and can rotate and, contrary to the normal practice, is externally firmly connected to the centre-piece 18b of a bell which surrounds the pump impeller whereby either, as illustrated, the wall 18c of the turbine blade assembly is itself sufficiently strong, rigid and thick enough to absorb the centrifugal and internal pressures and to seal off the interior of the converter or, as is not illustrated, this wall is only an outer shell within which the blade assembly with the envelope which carries the blades and which is not sealed, is inserted slackly but so that it cannot rotate. The central piece of the surrounding bell 18b, consists in an unusual manner of a forged, hammered or pressed, partially expanded cylinder, which is made in a novel way, not from cast or sheet metal but from steel so as to be able to absorb the high centrifugal and pressure forces. It is fitted, with its expanded right-hand-side edge into a disc 18d and firmly bolted to this and to a disc 18e. The disc 18e is mounted centrally on the end of the shaft 15a in the fourth intermediate bearing 15b of the same.

A bridge-coupling 20 between the discs 18d and 18e permits the turbine-wheel 18 of the converter to be firmly coupled to its pump impeller so that the converter can be made into a solid coupling in the usual manner in the upper speed range. The automatic engagement and disengagement of the bridge-coupling 20 is effected by a centrifugal and pressure-controlled regulating valve 20a which is positioned on the rotating turbine portion of the converter. It therefore regulates in accordance with the output speed and not, as in previously proposed designs, in accordance with the pump, or input-speed of the converter. The regulating valve 20a is mounted in a novel manner so that it is easily accessible on the output side periphery of the converter bell-casing 18b, c, d, e which surrounds the converter pump impeller.

On the shell 18c of the turbine blade-assembly, the rotor of a hydrodynamic brake 34 is mounted, whose stators are firmly mounted or cast in the housing 23a. This novel arrangement permits, by reason of the smallness of the blade-rims on the brake, that the same can be constructed of cheap die-casting and offers considerable advantages by comparison with the other well-known designs, see FIGS. 3 and 4. Brakes of this type are normally positioned on the output shaft of a power unit behind the shift gearbox, since they can subsequently easily be installed in this position should they be ordered separately. The brake in FIG. 4 is fitted in this manner. The braking power of this is identical with the brake which is positioned in accordance with the present invention, see FIG. 3. The brake in FIG. 3 is mounted on the input-shaft to the shift gearbox, between converter and shift-change gearbox, which permits of its construction being so much smaller. Nevertheless there is another advantage which is of importance with small brakes, in that the diameter which may be chosen for them when installed in the position indicated can be greater than that for brakes in the usual position. Further advantages are offered by the arrangement here proposed of mounting the brake rotor on the converter or turbine-shell since this permits the avoidance of the actual brake-wheel being larger as would be expected with a greater brake diameter. As can be seen, only a short annular flange is connected to the blade-rim of the rotor, by means of which the rotor is held fast.

The converter 17, together with the bridge-coupling 20 and the hydrodynamic brake 34, form a second, self-contained, transmission component-group, the hydrodynamic group, which, as will be noticed, is organically independent.

The hydrodynamic group is secured by means of a flange-facing to the flange of a short, fast-rotating shaft 19. This shaft is supported, together with the long fast-rotating shaft 15a, in the connecting bearing 15b. It carries a novel, long pinion 22 which represents the sunwheel of a secondary gear 23. This gear includes long first planet wheels 26a, the length of which corresponds to the contact-length of the teeth of the sunwheel 22 and the short second planet wheels 27 which together are secured to a planet-carrier 24. The planet-carrier 24 is arranged so that it can float on the teeth of the sunwheel 22 and is held axially between two walls 23c and 23d of the housing which project inwards.

The first planet wheels 26a drive the second planet wheels 27 and also a first annulus 33b which is mounted so that it floats on the former and which carries a clutch-rim 32b. It can rest on fingers or a support-cup 33d which are firmly mounted on the transmission output-shaft 25. The second planet wheels drive a second annulus 33c which floats upon them and which can rest against a projection 23e in the housing.

The planet-carrier 24 can be stopped by means of a disc-brake 29 which is actuated by an annular-piston 29a which, together with the brake, can be completely housed in the annular space which connects radially on to the planet-carrier. The second annulus 33c can be stopped by means of a second disc-brake 35, which is actuated by an annular-piston 35a which, together with the brake, can be completely housed in the annular space which connects radially with the second annulus. Both disc-brakes are represented as single-disc brakes, the discs of which can be forced tightly against the housing by means of very high pressure.

The short, fast-rotating shaft 19, is mounted so that it can rotate within the transmission output shaft 25, in a fifth connecting bearing 19a. The transmission output shaft 25 is furnished with slanting grooves 25b, along which the sleeve of the movable cup 25a can simultaneously slide and turn. This movable cup carries two clutch-rims 32a and 32a', of which the first, when the sleeve of the movable cup moves to the right, can mesh with the clutch-rim 32b of the first annulus 33b whilst the other, when the sleeve of the movable cup travels to the left, can be brought into mesh with the edge 33g of the inner gear-rim of the second annulus 33c which, in this case, must also be fashioned as a meshing clutch-rim. A hook 33e on the movable cup permits the finger, or the support-cup 33d, to be carried with it when it moves to the right.

Both the primary and the secondary gears should be manufactured with slanting teeth. This has the advantage that the teeth can be loaded considerably more highly than with straight toothing of the same modulus and the same pitch circle diameter. This makes it possible to construct the primary gear to such small dimensions that it can comfortably find room in the flywheel-space, without reducing the dimensions of the vibration damper, and it will be feasible to design the secondary gear to such small dimensions that the disc brakes may still be housed without difficulty in the annular spaces which surround them without the outside diameter of the gearbox group exceeding the diameter of the hydrodynamic group.

It should here be mentioned that the transmission assembly described, having an external hydrodynamic converter diameter of only 324 mm., is designed for a power unit of 240 HP and is thus of extremely small dimensions. This is achieved not only by laying out each important part so that it is stressed to its maximum permanent loading but also that it is designed in accordance with the precepts given here so that it performs the maximum work in the minimum space.

The teeth on both the primary and secondary gears should have the same inclination. In this way it is ensured that the axial lateral pressures resulting from the sloping teeth on the sunwheels 15 and 22 will be opposed to each other and, provided that the helical teeth are set at a suitable angle, will cancel each other out. In the primary gear there will still be a lateral force on the annulus 9, which will be absorbed by the vibration damper and the flywheel. The planet carriers of both the primary and secondary gears are free from lateral forces since the tooth side-pressures which act upon them, counterbalance each other.

The clutch-rims 32a and 32a' on the movable cup, as well as their associated annuli 33b and 33c, have helical inclined dogs so that the annuli 33b and 33c under load are not subjected to any lateral forces since those side-pressures which act upon them counterbalance each other. Only when the annuli 33b and 33c without load can run freely with them i.e. when they are neither stopped nor the dogs in mesh, are they gently pressed against their supports 23e or 33d. This design offers special advantages in the easy engagement and disengagement of the dogs as will be seen later.

The inclined grooves 25b on the transmission output shaft 25, slope in the same direction as the helical gearing on the sunwheel 22. This is of importance for the easy engagement of the clutch-rim on the movable cup and also ensures that the movable cup will remain in the terminal positions to which it has travelled, without safety precautions.

The shift-gearbox, together with the disc brakes and the movable cup, as well as the output-shaft, form a third transmission group; the shift gearbox group.

In FIG. 5, 40 represents a main lubrication and operating fluid pump which works with a moderate fluid pressure of approximately 3.5 kp./cm.$^2$ and, through pipes 42, supplies the transmission with lubricating fluid for the bearings and gears or operating fluid for the hydrodynamic equipment. A very small supplementary high-pressure pump 41 supplies the fluid necessary to replace the leakage losses at the annular pistons 29a and 35a. Furthermore, a spring-loaded maximum pressure valve 43 is provided in the pressure-piping of the main pump. From the pressure side of the main pump an auxiliary pipe 44 leads to a by-pass valve 45 which lies in the by-pass to the maximum pressure valve 43 and also to the inlet side of the high-pressure pump 41 and finally, by way of a simple check valve 46, to the input side 52a of a selector valve 47, from which pipes 29b and 35b lead to the annular pistons of the disc-brakes 29 and 35. A discharge pipe 48 leads from the selector valve 47 to the oil-sump 51 from which the pumps draw off liquid. The pressure side of the high-pressure pump is likewise connected to the input-side 52a of the selector valve 47. The customary relief valves 49 and 50 are accordingly provided in the pump by-pass.

The operation of the by-pass valve 45 is linked to that of the selector valve 47 in such a way that its axis of symmetry and that of the by-pass valve, which are shown by chain-dotted lines, are brought into parallel on actuating the selector valve. A special return device 52 which is not shown in detail, having a return-spring for the by-pass valve and a delayed action switch, ensures that the valve, at the end of a specific period after actuation of the gear-changer, e.g., 0.5 sec., again returns to its neutral position allowing free flow, when the axis of symmetry shown on the drawing will be vertical.

The operation of the selector valve is preferably effected electrically by means of three pushbuttons 53, 54, 55 (FIG. 6) which correspond to the three gear-positions: "No-load (D)," "Low gear (I)," "High gear (II)." These push-buttons are preferably secured to a selector-lever 56 which enables the position of the movable cup 25a to be selected or changed. The selector-lever has the three positions:

"Neutral (N)," "Forward (V)," "Reverse (R)."

The manner of operation of the transmission is as follows: the torque which is transmitted from the internal combustion engine to the flywheel, is then passed on to the annulus 9 of the primary gear 8 by way of a vibration damper which, in essentials, effects a rectification of an irregular power transfer in the event of the torque changing direction. In the primary gear 8 there is not only a distribution of the torque but also a torque conversion. A considerably greater torque than that received from the internal combustion engine is passed on to the primary planet-carrier 7 which is connected to the blower drive. This large torque is furnished with relatively little power since the supercharger-blower, driven by it through intermediate gearing, only absorbs a fraction of the power of the internal combustion engine. As a result of this, the planet-carrier 7, even at its maximum speed, only rotates very slowly, at less than 100 r.p.m. In the intermediate gearing leading to the blower, the high torque received will be reduced and, at the same time, the speed increased until, at the shaft 13, the blower-torque will be decreased to that necessary for the required supercharger pressure whereby the blower speed will be in accordance with the quantity of input air required by the internal combustion engine.

A considerably smaller torque than that received from the internal combustion engine will be transmitted by the annulus 9 of the primary gear 8 to its sunwheel 15. Since this, under operating conditions, absorbs a high proportion of the power of the internal combustion engine, it has a considerably higher speed than the internal combustion engine. The small torque is transmitted through the long, fast-rotating shaft 15a. A portion of this is diverted to power the auxiliary output drives, among which can be numbered a power take-off point. The major portion of this torque will normally be transmitted to the pump impeller 16 of the converter. This will transfer it—after conversion at low output-speeds to a higher value—to the turbine wheel 18, whence it will again be passed on to the sunwheel of the shift gearbox. The bridge-coupling 20 of the converter will be automatically engaged at a specific, but still relatively low output speed, so that there will no longer be any torque conversion in the converter and also no slip, since this bridge-coupling will then only serve as a connecting-member without losses. From this speed, the full torque of the power unit will fall uniformly up to the maximum operating speed, in accordance with the "Differential-Diesel-Characteristic" so that, altogether, the well-known "Steam-engine Characteristic" results.

When the internal combustion engine is idling, the person in charge, e.g., the driver of a heavy road-vehicle, has set the shift gearbox in the neutral position. The pushbutton 53 for the D position of the gear-shift is depressed and the selector-lever 56 for the movable-cup 25a is then in the N position. In this situation, the axis of symmetry of the selector valve 47 (FIG. 5) is vertical in the diagram and the movable-cup 25a is in its central position, with the clutch-rims not in mesh. The pump impeller of the converter, which is being driven without load by the internal combustion power unit, carries with it the turbine wheel, and the sunwheel 22 will likewise be driven without load, whereby it has a higher idling speed than the idling speed of the internal combustion engine. The planet-carrier 24 of the shift gearbox likewise is also rotating at a lower idling speed than the engine idling speed, whilst the annuli 33b and 33c are stationary since the lateral pressure, which is exerted on them by the helical toothing, pushes them against their right-hand side limits which is sufficient to gently retard their rotation and to stop them.

If the driver wishes to travel under load, he first uses the selector-lever 56 to push the movable cup into one of its terminal positions, e.g., V (Forward). This Forward position corresponds with the dogs on the movable cup meshing to the right, whilst the Reverse position corresponds to their meshing to the left. When the movable cup is pushed to the right into the Forward position, the clutch-rim 32a on the movable cup is turned with it in the direction of the Forward direction of rotation of the transmission output-shaft (arrowed), since the helical grooves 25b on the stationary transmission output-shaft act in this direction. Shortly before the clutch-rim 32b makes contact, the support-cup 33d is released from the annulus 33b by the hook 33e, so that the annulus 33b starts to rotate in a Forward direction. At this moment, the projecting dogs of the clutch-rim 32a, which is rotating in the same direction, engage without difficulty in the clutch-rim 32b. If, however, at the instant of meshing the dog position is not favourable for easy engagement, in such a case the clutch-rim 32b will push past on to the clutch-rim 32a. Reciprocal sharpening of the dogs on their sides of engagement will contribute to easy meshing and, if such reciprocal sharpening is carried out the hook 33e can be dispensed with.

The Reverse position can be obtained in a similar manner if the movable cup is pushed towards the left by the driver pushing the selector-lever into the terminal position R. When actuating the selector-lever, the pushbutton 53 for the D (Idling or No-load) position of the selector valve 47, always remains pushed in.

Two gearstages can be engaged in the Forward position but only one in the Reverse position. The lower V (Forward) or R (Reverse) gear can be obtained by depressing the push-button 54, when the push-button 53 will spring out. In this case, the axis of symmetry of the selector valve 47 (FIG. 5) will move to the right-hand slanting position. In the oil circuit, the direct flow of oil through the plug of the by-pass valve 45 will be blocked and the normally low oil-pressure on the pressure-side of the main oil pump 40 which is determined by the overflow valve 49, will now rise to a higher value which is determined by the maximum-pressure valve 43. Through the return-valve 46, a greater quantity of oil under increased pressure will be dispatched in the pipe 29b to the disc brake 29, so that this will be instantaneously arrested.

The driver can now start to operate in low gear. Unobserved by the driver, a short time after the push-button 54 has been depressed, the by-pass valve 45 has been returned to its normal free-flow position by the action of the return-device 52. The main pump 40 now again operates under normal pressure. The disc-brake 29, however, still remains locked, since the annular piston 29a is maintained under high pressure by the small high-pressure pump 41. The leakage losses of the annular piston 29a are made good by the high-pressure pump 41, whose pressure is set by the spill-valve 50.

It is advisable that the pressure, which is determined by the spill-valve 50, should be selected so that it is considerably higher than the pressure which can be set by means of the maximum-pressure valve 43.

When changing to high gear in the V (Forward) position on the selector-lever, the push-button 55 is depressed. The axis of symmetry of the selector valve 47 then moves so that it slopes to the left. The direct flow from the main oil pump 40 through the bypass valve 45 is again temporarily interrupted. The annular piston 35a of the right-hand disc brake is briefly subjected to a greater flow of oil under increased pressure and operates the relevant disc. Operation in high gear can now be effected whereby, again unnoticed by the driver, the by-pass valve 45 will be returned to its free-flow position shortly after engaging the gear. The leakage-oil losses of the annular piston 35a will again be made good under high pressure by the small high-pressure pump 41.

When shifting to Reverse the driver depresses the No-load/Idling pushbutton 53, sets the selector-lever 56 in the R (Reverse) position, and depresses the pushbutton of the low gear 54. Changing to Reverse is, however, only possible when the rotation speed of the transmission output shaft is zero, or very low, since otherwise the dogs of reverse gear would not engage. It is however possible to fit both Reverse and Forward gear with synchronizing equipment so that engagement of Reverse and Forward gears can be effected even when the transmission output shaft speeds are somewhat higher. The synchronizing equipment need not, therefore, be expensive since only the masses of the annuli 33c or 33b need to be moved, whilst the sunwheel 22 and the high masses of the converter retain their original speeds.

The actuation of the bridge-coupling 20 is effected automatically during operation, unnoticed by the driver, as soon as the short, fast-rotating shaft 15a has attained a certain minimum speed. This minimum speed in low gear corresponds to a considerably lower output speed than in high gear.

If the driver wishes to operate the hydrodynamic brake 34, he can allow oil to enter the brake in a controlled manner whereby an infinitely variable control of the oil content, and consequently the performance of the brake, can be obtained in the conventional way by regulating the internal pressure of the same. To obtain this control it is only necessary to follow the usual practice of adjusting the pressure in the interior of the brake by using a variable, external, stationary spill-valve.

In high gear the hydrodynamic brake has a considerably lower speed than—with the same output-shaft speed—in low gear. If, therefore, the braking effect at a lower output-shaft speed in high gear is not sufficient, then the driver should change to the low gear when he will immediately obtain a considerably increased braking effect. If, for example, the gear-ratios are designed as follows (corresponding to the dimensions in FIG. 1): Low gear 3.15:1; High gear 1.45:1; Reverse 4.54:1; the braking effect in low gear will be 10.5 times as great as in high gear, and in reverse gear 32 times as great as in high gear.

It can therefore be seen, as is evident from FIGS. 3 and 4, that a hydrodynamic brake of very small dimensions, constructed in accordance with the invention, replaces a brake of considerably greater dimensions which is mounted in the customary manner on the transmission output-shaft. The brake illustrated in FIG. 4 is mounted on the output-shaft, whilst that in FIG. 3 is positioned in accordance with the terms of the present invention.

The diagrammatic representation of the shift gear box as shown in FIGS. 7, 8 and 9 are referenced with the same numerals as used above and the following description is provided by way of further explanation.

The first planet wheels 26a are here designed as "long" "Ravigneaux" planets. The driving sunwheel 22 can be positioned on the output side, or on the input side, or in the middle between both, since here this is of no fundamental importance as the secondary sunwheel is missing. In FIGS. 7 and 9 it is represented as a wheel which extends over the whole axial length of the long planet wheels. This has the advantage that undesirable bending moments on the planet wheel shafts, such as arise in conventional Ravigneaux arrangements, are eliminated. The first planet wheels 26a also drive the first annulus 33b which carries the brake rim 32b, which becomes a part of the coupling 32. The second planet wheels 27 are short, single-stage wheels whose inner contact-arc diameter 39 exceeds the outer contact diameter 22a of the primary sunwheel 22 in a novel manner (see FIG. 8). They mesh on the outside with the annulus 33c which can be firmly connected to the gearbox casing 23a, by means of the brake 35. The planet-carrier 24 can be firmly connected to the gearbox casing 23a by means of the brake 29.

The annulus 33c also carries in a novel manner the other brake rim 32c, which is an element of the coupling 32. Furthermore, the bell-housing 25a which is firmly mounted, or snug-fitting and movable, on the output-shaft 25, carries in a novel manner the movable or rigidly-mounted brake rim 32a. This latter can be made to engage by movement both with the brake rim 32b and also with the brake rim 32c, whereby retention devices of the conventional type which are not shown on the drawing ensure that it is retained in the required engagement position. The movement of the coupling can be effected by, for example, means of a piston (not illustrated) through oil-pressure, or by means of a handlever.

The manner of operation is as follows:

The sunwheel 22 transmits the torque absorbed to the first planet wheels 26a. These pass it on to the annulus 33b in the slow forward gear. The slow forward gear is obtained by engaging the multiple-disc brake 29, the coupling 32 being placed in the position Forward when the brake rim 32a will engage with the brake rim 32b. On engagement of the brake 29, the planet carrier 24 will be locked. On engaging the brake 35, the fast forward gear will be obtained. In this case the flow of power passes, even in fast forward gear, from the first planet wheels 26a, through the first annulus 33b, to the output-shaft 25.

If the position of the coupling 32 is moved from Forward to Reverse whilst the brake-rim 32a is brought into mesh with the brake rim 32c, reverse-gear is obtained. The simultaneous engagement of the multiple-disc brake 29 is necessary.

The flow of power in reverse gear passes from the first planet wheels 26a to the second planet wheels 27, and from these to the second annulus 33c, which is firmly connected to the output shaft 25 on engagement of the coupling 32.

In the typical layout illustrated in FIGS. 7, 8 and 9, it is noteworthy and advantageous that the planet carrier 24 and the annuli 33b and 33c can be designed without difficulty so that they "float," i.e. without having central support. This permits of a particularly cheap, and at the same time, efficient design of the epicyclic gearbox, since both the planet wheels in the planet carrier and also the annuli can centre themselves on the central sunwheel 22 so that, on the one hand, the requirements for accuracy in the arrangement of the concentric epicyclic gearbox axes is reduced and, on the other hand, the precision of the meshing of the teeth is improved.

FIG. 9 makes this clear. The planet carrier is not supported centrally but engages loosely, via a carrier cogwheel 38a, with the centrally-supported tube 38 which carries part of the clutch 29. The annulus 33c is likewise not centrally supported and is loosely connected by means of a carrier cogwheel 37a with the tube 37 which carries part of the brake 35 so that this tube 37 does not impair the floating arrangement of the annulus.

The embodiments of the invention in which an exclusive property or privilege is claimed are defined as follows:

1. A transmission assembly of the type including a differential gear unit comprising a primary planetary gear set and a change speed gear unit comprising a secondary planetary gear set, said primary gear set including an input member adapted to be rotated in one direction and a pair of primary output members one of which rotates in the opposite direction of said input member, a hydrodynamic torque converter unit between said differential gear and said change speed gear and including an impeller member connected to said one primary output member and a turbine member connected to an input sun gear member of said change speed gear unit, said connection between said one primary output member and said impeller member constituting a shaft extending through said turbine member and said connection between said turbine member and said secondary input member constituting a bell housing enclosing said impeller member, said second planetary gear set including a pair of intermeshing planet gears mounted for rotation on a carrier member, one of said planet gears meshing with said input sun gear, a first annulus gear meshing with said one planet gear and a second annulus gear meshing with the other planet gear, an output shaft, means for selectively connecting said output shaft with either said first or second annulus gears and locking means for selectively holding said carrier member or said second annulus gear, said output shaft being rotated in said one direction when connected to said first annulus gear and rotated in said opposite direction when connected to said second annulus gear, said rotation in said one direction being at a relatively low speed when said second annulus gear is free to rotate and at a relatively high speed when said second annulus gear is held against rotation.

2. A transmission assembly according to claim 1 wherein a housing partition is located between said primary gear unit and said hydrodynamic torque converter.

3. The transmission of claim 2 wherein said shaft has a power take-off gear secured thereon between said primary gear and said housing partition.

4. The transmission of claim 1 wherein a coupling is provided for connecting said impeller and turbine and means for controlling said coupling.

5. The transmission of claim 1 wherein said first and second annulus gears are float mounted on their respective planet gears.

6. The transmission of claim 1 wherein a hydrodynamic brake is provided with a rotor member connected to the turbine member.

7. A transmission according to claim 1 wherein a control system for said locking means for selectively holding said carrier, and said second annulus gear includes a pressure supply having a main low pressure pump and a supplementary high pressure pump fed from said main pump and valve means for connecting the outputs of both of said pumps to said locking means.

8. A transmission assembly including a planetary gear unit including an input sun gear, a first set of planet pinions meshing with said sun gear and mounted for rotation on a planet carrier, a second set of planet pinions meshing with said first set of planet pinions and also mounted for rotation on the carrier, a first annulus gear member meshing with said first set of planet pinions, a second annulus gear member meshing with said second set of planet pinions, an output shaft, means for selectively connecting said output shaft to said first or said second annulus gears, means for selectively holding said carrier member against rotation, and means for selectively holding said second annulus gear against rotation, said output shaft being rotated at one speed in a reverse direction from the input shaft when connected to said first annulus member and when said carrier member is held against rotation and at another speed in a reverse direction when the output shaft is connected to said first annulus gear and said second annulus gear is held against rotation and in a forward direction relative to the input shaft when said output shaft is connected to said second annulus gear.

References Cited

UNITED STATES PATENTS

| | | | |
|---|---|---|---|
| 2,149,785 | 3/1939 | Neugebauer | 74—675 |
| 2,320,757 | 6/1943 | Sinclair et al. | 74—339 |
| 2,467,077 | 4/1949 | Brunken | 74—675 |
| 2,631,476 | 3/1953 | Ravigneaux | 74—759 |
| 2,769,303 | 11/1956 | Lucia et al. | 74—688 |
| 3,007,302 | 11/1961 | Vincent | 60—13 |
| 3,069,925 | 12/1962 | Roche | 74—472 |
| 3,142,369 | 6/1964 | Atkins | 192—3.24 |
| 3,160,026 | 12/1964 | Rosen | 74—410 |
| 3,362,259 | 1/1968 | Hayward | 74—688 XR |
| 3,369,430 | 2/1968 | Haley | 74—752 |

FOREIGN PATENTS

| | | |
|---|---|---|
| 1,147,662 | 11/1957 | France. |
| 927,418 | 5/1963 | Great Britain. |

ARTHUR T. McKEON, *Primary Examiner.*

U.S. Cl. X.R.

74—764